US010601848B1

(12) United States Patent
Jeyaraman et al.

(10) Patent No.: US 10,601,848 B1
(45) Date of Patent: Mar. 24, 2020

(54) CYBER-SECURITY SYSTEM AND METHOD FOR WEAK INDICATOR DETECTION AND CORRELATION TO GENERATE STRONG INDICATORS

(71) Applicant: FireEye, Inc., Milpitas, CA (US)

(72) Inventors: Sundararaman Jeyaraman, Hayward, CA (US); Ramaswamy Ramaswamy, Fremont, CA (US)

(73) Assignee: FireEye, Inc., Milpitas, CA (US)

( * ) Notice: Subject to any disclaimer, the term of this patent is extended or adjusted under 35 U.S.C. 154(b) by 264 days.

(21) Appl. No.: 15/638,262

(22) Filed: Jun. 29, 2017

(51) Int. Cl.
*G06F 12/14* (2006.01)
*H04L 29/06* (2006.01)

(52) U.S. Cl.
CPC ........ *H04L 63/1425* (2013.01); *H04L 63/145* (2013.01)

(58) Field of Classification Search
CPC .......................... H04L 63/1425; H04L 63/145
USPC ...................................................... 726/23, 25
See application file for complete search history.

(56) References Cited

U.S. PATENT DOCUMENTS

| | | |
|---|---|---|
| 4,292,580 A | 9/1981 | Ott et al. |
| 5,175,732 A | 12/1992 | Hendel et al. |
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowlard |
| 5,842,002 A | 11/1998 | Schnurer et al. |
| 5,878,560 A | 3/1999 | Johnson |
| 5,960,170 A | 9/1999 | Chen et al. |
| 5,978,917 A | 11/1999 | Chi |
| 5,983,348 A | 11/1999 | Ji |
| 6,013,455 A | 1/2000 | Bandman et al. |
| 6,088,803 A | 7/2000 | Tso et al. |
| 6,092,194 A | 7/2000 | Touboul |
| 6,094,677 A | 7/2000 | Capek et al. |

(Continued)

FOREIGN PATENT DOCUMENTS

| | | |
|---|---|---|
| EP | 3107026 A1 | 12/2016 |
| GB | 2439806 A | 1/2008 |

(Continued)

OTHER PUBLICATIONS

PCT/US2018/040470 filed Jun. 29, 2018 International Search Report and Written Opinion dated Sep. 14, 2018.

(Continued)

*Primary Examiner* — Aravind K Moorthy
(74) *Attorney, Agent, or Firm* — Rutan & Tucker, LLP

(57) ABSTRACT

A method for detecting a cyber-attack is described. The method features (i) collecting a first plurality of weak indicators, (ii) grouping a second plurality of weak indicators from the first plurality of weak indicators where the second plurality of weak indicators being lesser in number than the first plurality of weak indicators, and (iii) performing a correlation operation between the second plurality of weak indicators and one or more patterns or sequences of indicators associated with known malware. A weak indicator of the first plurality of weak indicators corresponds to data that, by itself, is not definitive as to whether the data is associated with a cyber-attack being conducted on a source of the weak indicator.

20 Claims, 8 Drawing Sheets

(56) References Cited

U.S. PATENT DOCUMENTS

| | | |
|---|---|---|
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |

(56) References Cited

U.S. PATENT DOCUMENTS

| | | |
|---|---|---|
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,506 B1 * | 4/2017 | Han .................. H04L 63/1441 |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |

(56) References Cited

U.S. PATENT DOCUMENTS

| | | |
|---|---|---|
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |

(56) References Cited

U.S. PATENT DOCUMENTS

| | | |
|---|---|---|
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |

(56) References Cited

U.S. PATENT DOCUMENTS

| | | |
|---|---|---|
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0321290 A1* | 10/2014 | Jin ................. H04L 47/2441 370/241 |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1* | 4/2015 | Mesdaq ............ H04L 63/145 726/23 |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0314411 A1* | 10/2016 | Kumar .................. G06N 20/00 |
| 2016/0335110 A1 | 11/2016 | Paithane et al. |
| 2017/0063893 A1* | 3/2017 | Franc .................. H04L 63/0281 |
| 2017/0083703 A1 | 3/2017 | Abbasi et al. |
| 2017/0134404 A1* | 5/2017 | Machlica ............ H04L 63/1416 |
| 2018/0013770 A1 | 1/2018 | Ismael |
| 2018/0048660 A1 | 2/2018 | Paithane et al. |
| 2018/0091530 A1* | 3/2018 | Rook .................. H04L 63/1416 |
| 2018/0121316 A1 | 5/2018 | Ismael et al. |
| 2018/0241761 A1* | 8/2018 | Bania .................. H04L 63/1425 |
| 2018/0288077 A1 | 10/2018 | Siddiqui et al. |

FOREIGN PATENT DOCUMENTS

| | | |
|---|---|---|
| GB | 2490431 A | 10/2012 |
| WO | 2/06928 A2 | 1/2002 |
| WO | 02/23805 A2 | 3/2002 |
| WO | 2007-117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |
| WO | 2015/047802 A2 | 4/2015 |
| WO | 2015/200360 A1 | 12/2015 |

OTHER PUBLICATIONS

"Mining Specification of Malicious Behavior"—Jha et al, UCSB, Sep. 2007 https://www.cs.ucsb.edu/.about_chris/research/doc/esec07.sub.--mining.pdf- .

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.isp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye"), (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Baldi, Mario; Risso, Fulvio; "A Framework for Rapid Development and Portable Execution of Packet-Handling Applications", 5th IEEE International Symposium Processing and Information Technology, Dec. 21, 2005, pp. 233-238.

Bayer, et al., "Dynamic Analysis of Malicious Code", J Comput Virol, Springer-Verlag, France., (2006), pp. 67-77.

Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).

Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

(56) References Cited

OTHER PUBLICATIONS

Cisco, Configuring the Catalyst Switched Port Analyzer (SPAN) ("Cisco"), (1992).
Clark, John, Sylvian Leblanc,and Scott Knight. "Risks associated with usb hardware trojan devices used by insiders." Systems Conference (SysCon), 2011 IEEE International. IEEE, 2011.
Cohen, M.I. , "PyFlag—An advanced network forensic framework", Digital investigation 5, Elsevier, (2008), pp. S112-S120.
Costa, M. , et al., "Vigilante: End-to-End Containment of Internet Worms", SOSP '05, Association for Computing Machinery, Inc., Brighton U.K., (Oct. 23-26, 2005).
Crandall, J.R. , et al., "Minos:Control Data Attack Prevention Orthogonal to Memory Model", 37th International Symposium on Microarchitecture, Portland, Oregon, (Dec. 2004).
Cyrus, R. "Detecting Malicious SMB Activity Using Bro" The SANS Institute, Dec. 13, 2016.
Deutsch, P. , "Zlib compressed data format specification version 13" RFC 1950, (1996).
Distler, "Malware Analysis: An Introduction", SANS Institute InfoSec Reading Room, SANS Institute, (2007).
Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
Excerpt regarding First Printing Date for Merike Kaeo, Designing Network Security ("Kaeo"), (2005).
Filiol, Eric , et al., "Combinatorial Optimisation of Worm Propagation on an Unknown Network", International Journal of Computer Science 2.2 (2007).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gibler, Clint, et al. AndroidLeaks: automatically detecting potential privacy leaks in android applications on a large scale. Springer Berlin Heidelberg, 2012.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hjelmvik, Erik , "Passive Network Security Analysis with NetworkMiner", (IN)Secure, Issue 18, (Oct. 2008), pp. 1-100.
Idika et al., A-Survey-of-Malware-Detection-Techniques, Feb. 2, 2007, Department of Computer Science, Purdue University.
IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Krasnyansky, Max , et al., Universal TUN/TAP driver, available at https://www.kernel.org/doc/Documentation/networking/tuntap.txt (2002) ("Krasnyansky").
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Leading Colleges Select FireEye to Stop Malware-Related Data Breaches, FireEye Inc., 2009.
Li et al., A VMM-Based System Call Interposition Framework for Program Monitoring, Dec. 2010, IEEE 16th International Conference on Parallel and Distributed Systems, pp. 706-711.
Liljenstam, Michael , et al., "Simulating Realistic Network Traffic for Worm Warning System Design and Testing", Institute for Security Technology studies, Dartmouth College ("Liljenstam"), (Oct. 27, 2003).
Lindorfer, Martina, Clemens Kolbitsch, and Paolo Milani Comparetti. "Detecting environment-sensitive malware." Recent Advances in Intrusion Detection. Springer Berlin Heidelberg, 2011.
Lok Kwong et al: "DroidScope: Seamlessly Reconstructing the OS and Dalvik Semantic Views for Dynamic Android Malware Analysis", Aug. 10, 2012, XP055158513, Retrieved from the Internet: URL:https://www.usenix.org/system/files/conference/usenixsecurity12/sec12- -final107.pdf [retrieved on Dec. 15, 2014].
Marchette, David J., "Computer Intrusion Detection and Network Monitoring: A Statistical Viewpoint", ("Marchette"), (2001).
Margolis, P.E. , "Random House Webster's 'Computer & Internet Dictionary 3rd Edition'", ISBN 0375703519, (Dec. 1998).
Moore, D. , et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt , "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Newsome, J. , et al., "Polygraph: Automatically Generating Signatures for Polymorphic Worms", In Proceedings of the IEEE Symposium on Security and Privacy, (May 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.—N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S. , et al., "Automated Worm Fingerprinting", Proceedings of the ACM/USENIX Symposium on Operating System Design and Implementation, San Francisco, California, (Dec. 2004).
Spitzner, Lance , "Honeypots: Tracking Hackers", ("Spizner"), (Sep. 17, 2002).
The Sniffers's Guide to Raw Traffic available at: yuba.stanford.edu/.about.casado/pcap/section1.html, (Jan. 6, 2014).
Thomas H. Ptacek, and Timothy N. Newsham , "Insertion, Evasion, and Denial of Service: Eluding Network Intrusion Detection", Secure Networks, ("Ptacek"), (Jan. 1998).

(56) References Cited

OTHER PUBLICATIONS

U.S. Pat. No. 8,171,553 filed Apr. 20, 2006, Inter Parties Review Decision dated Jul. 10, 2015.
U.S. Pat. No. 8,291,499 filed Mar. 16, 2012, Inter Parties Review Decision dated Jul. 10, 2015.
Venezia, Paul , "NetDetector Captures Intrusions", InfoWorld Issue 27, ("Venezia"), (Jul. 14, 2003).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Hiroshi Shinotsuka, Malware Authors Using New Techniques to Evade Automated Threat Analysis Systems, Oct. 26, 2012, http://www.symantec.com/connect/blogs/, pp. 1-4.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Lastline Labs, The Threat of Evasive Malware, Feb. 25, 2013, Lastline Labs, pp. 1-8.
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

\* cited by examiner

RULE ID: 1  ~610
       SEVERITY: 10  ~620
       NAME: "SAMPLE CORRELATION RULE"  ~630
  640  REINSERT: "NO"  ~635
    ↘  RULE:
          PATTERN: {
    650 ── SOURCES: {
             EVENT   : [WEAK INDICATOR 1]
             NAME    : "EVENT 1"
             EVENT   : [WEAK INDICATOR 2]
             NAME    : "EVENT 2"
             }
    660 ── GROUP     : "IP SOURCE AND DESTINATION ADDRESS",
    670 ── CONDITION: "EVENT 1" AND "EVENT 2"
    680 ── NAME      : "PATTERN 1"
          }
```

… # CYBER-SECURITY SYSTEM AND METHOD FOR WEAK INDICATOR DETECTION AND CORRELATION TO GENERATE STRONG INDICATORS

FIELD

Embodiments of the disclosure relate to cyber security. More particularly, one embodiment of the disclosure relates to a rules-based system and method for detecting cyber-attacks.

GENERAL BACKGROUND

Electronic computing systems provide useful and necessary services that assist individuals in business and in their everyday lives. In recent years, a growing number of cyber-attacks are being conducted on governmental agencies and private enterprises. These cyber-attacks tend to focus on computing systems with network connectivity (referred to as "network devices") communicatively coupled to a network within the governmental agency or private enterprise. These cyber-attacks are orchestrated in an attempt to gain access to content stored on these computing systems for illicit (i.e., unauthorized) purposes, such as spying or other malicious or nefarious activities.

Normally, cyber-attacks against computing systems are started by exploiting a weakness in software installed on the computing systems or a weakness in training where a person unknowingly compromises his or her computing system by allowing malicious software to be loaded thereon. Upon loading the malicious software, the attacker may gain entry to stored network resources maintained by the governmental agency or private company. Herein, the malicious software may include any software that is used to (i) monitor activity on a target computing system, (ii) cause harm to the target computing system, such as intentional corruption of data stored on the computing system, data theft (e.g., credentials, financial information such as credit card information, identity information, or the like), or (iii) assist in an exfiltration of data from the target computing system. Examples of malicious software may include, but are not limited or restricted to, viruses, trojan horses, rootkits, worms, advanced persistent threats (APTs), keyloggers, and/or other programs intended to compromise computing systems as well as the data stored on the computing system and other computing systems connected to the network.

Many computing systems within enterprises are monitored for purposes of security with a view to identifying indicators of compromise (IOCs) evidencing, verifying or tracking a cyber-attack. The resulting data can be presented to network or security administrators for her or his review, evaluation and, if appropriate, remedial action. This IOC detection process can be challenging as, after infiltration of the malicious software, the operations by the malicious software may bear a strong similarity to legitimate and typical communications exchanged within a network. Currently, some existing cybersecurity solutions may experience a high number of false positives or false negatives because actual malware within network traffic may be more subtle to detect than IOCs associated with detecting a breach of the network itself.

BRIEF DESCRIPTION OF THE DRAWINGS

Embodiments of the disclosure are illustrated by way of example and not by way of limitation in the figures of the accompanying drawings, in which like references indicate similar elements and in which:

FIGS. 6A and 6B are exemplary block diagrams of the operability of the weak indicator detection logic of FIG. 3.

DETAILED DESCRIPTION

I. Overview

Figure 1:
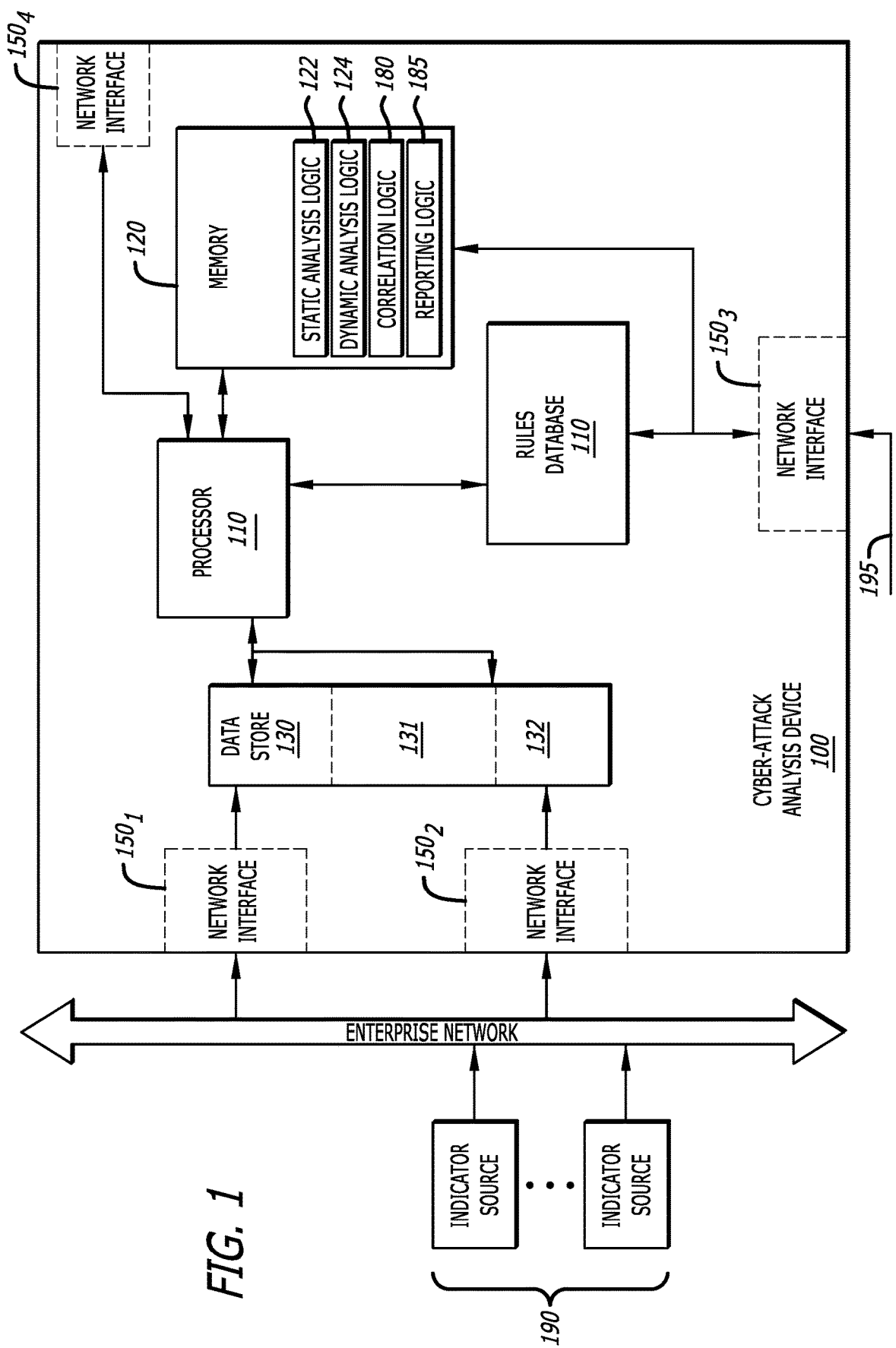
FIG. 1 is an exemplary block diagram of a general, physical representation of a cyber-attack analysis device.

In general, embodiments of the disclosure describe a cyber-attack analysis device that includes rule-based correlation logic configured to identify and collect indicators associated with analyzed content to form a set of indicators. An "indicator" is analytical information resulting from an analysis (static analysis) of the characteristics of an object and/or behaviors monitored during processing of the object (dynamic analysis). From the set of indicators, the correlation logic is configured to assemble one or more groups of "weak" indicators, each group consisting of multiple (i.e., two or more) "weak" indicators. A weak indicator corresponds to data that, by itself, is not definitive as to a determination of a cyber-attack. The indicators may be assigned to a group based on one or more "relatedness" (grouping) factor that the indicators of a group share in common, sometimes referred to as an index parameter. For example, the "weak" indicators may be grouped according to a selected time period during which each of these indicators was detected. The detection may occur during static analysis of an object (e.g., analysis of the characteristics of the object without execution of the object) or during dynamic analysis of an object (e.g., executing the object and monitoring the behavior of the object and/or the software used in execution of the object). Furthermore, the set of indicators may be grouped in accordance with dynamically modifiable rules available to the correlation logic. After this grouping, the correlation logic conducts an analysis to determine whether the group of indicators is correlated with known malicious patterns or sequences (ordering) of indicators, thereby producing a "strong" indicator. A strong indicator assists the cyber-attack analysis device in determining that a cyber-attack is being conducted on a particular computing system or enterprise, and a presence of the strong indicator may be reported as part of an alert (warning) to a network administrator.

As described below, correlation logic is configured to improve malware detection effectiveness while monitoring enterprise network traffic (e.g., identifying compromised computing systems communicating inside an enterprise network). More specifically, based on a plurality of prescribed correlation rules that are formulated and coded from experiential knowledge and previous malware analysis results, the correlation logic is configured to generate a "strong" indicator of compromise (hereinafter, "indicator") from a group of weak indicators. Herein, a "strong indicator" corresponds to data that, based on its presence alone, represents a high likelihood (e.g., probability exceeds a first selected threshold (e.g., percentage) of a cyber-attack. A "weak indicator" corresponds to data that, based on its presence alone, is not definitive as to whether the data is associated with a cyber-attack (e.g., weak indicator may represent a likelihood less than the first selected threshold of a cyber-attack. The weak indicator has (i) a low correlation with known cyber-attacks (e.g., malware), (ii) a high correlation with normal or expected characteristics or behaviors (during execution) of network traffic and/or conventional computer systems, or (iii) both. The correlation levels for a weak indicator are such that a conventional malware analysis schemes would not generally base a determination of a cyber-attack (e.g., malware) on such a weak indicator without a high risk (likelihood) of the determination being a false positive.

According to one embodiment of the disclosure, operating in accordance with the prescribed correlation rules, the correlation logic receives a plurality of indicators from one or more sources of the indicators (e.g., endpoint devices, security appliances, cloud-based malware analysis services, internal malware analysis logic, etc.) and may separate the strong indicators from the weak indicators. In conventional malware analysis schemes, the weak indicators may be discarded; however, as set forth in this disclosure, some or all of the received weak indicators are combined to form one or more groups (i.e., combinations) of indicators, each group includes multiple weak indicators. The group of indicators may be based on a temporal relationship such as, for example, each weak indicator from the group occurred during a predetermined period of time. Besides receipt (or occurrence) of the indicators within the predetermined time period, the group of indicators may be based, at least in part, on particulars associated with the prescribed correlation rules. These particulars may include weightings assigned to each type of weak indicator or frequency of occurrence of certain weak indicators for example.

After forming the group of indicators, the correlation logic conducts an analysis to determine whether the group of indicators (or a portion thereof) corresponds to a strong indicator. This analysis is conducted to determine compliance (or non-compliance) with the prescribed correlation rules that constitute rule-encoded attack characteristics and/or behaviors. Stated differently, the correlation logic determines, through experiential knowledge and intelligence from a variety of sources (e.g., deployed malware detection systems, incident response findings, and intelligence on malicious actors), whether there is a first prescribed level of correlation between the group of indicators and different patterns and/or sequences (ordering) of indicators of known malware (e.g., identical indicators, or substantially similar indicators, e.g., prescribed comparison rate, etc.). Responsive to determining that the first prescribed level of correlation has been achieved, the group of indicators collectively corresponds to a newly determined strong indicator. The correlation logic provides information associated with the newly determined strong indicator to reporting logic while, depending on the correlation rules governing the analysis, certain groups of indicators (e.g., a group of indicators that almost constitutes a "strong" indicator) may be returned to the correlation logic for further malware analysis The further analysis may involve, for example, combining the group of weak indicators with one or more additional indicators, modifying the prescribed level of correlation (matching) to thereby reconstitute the group (eliminating some indictors or adding additional ones, or otherwise modifying the group). Furthermore, the prescribed correlation rules may be updated and modified, as the strength of indicators typically change over time as the threat landscape evolves. Also, the rules may be altered based on new intelligence gathered from internal heuristics, incident response filing, third party sources, or the like.

A cyber-attack analysis device implementing the above-described correlation logic may be resident in a network appliance that resides on-premises, namely connected to a network such as an enterprise network (e.g., local area network) of a person or an organization for example. The cyber-attack analysis device is configured to receive information (including weak indicators) from other remotely located network appliances. As an additional feature, the cyber-attack analysis device may be configured to monitor network traffic propagating over the enterprise network to extract objects for malware analysis, where the indicators constitute a portion of the results from the malware analysis.

As an alternative embodiment, the cyber-attack analysis device may be a network appliance remotely located from the enterprise network (and organization), where the network appliance operates as a remote analysis service that receives indicators and/or objects from other network devices, including, for example, webpages, files, and/or emails. As yet another alternative embodiment, the cyber-attack analysis device may be a virtual (software) deployment, with the operability of the cyber-attack analysis device being provided, at least in part, by an operating system or other software running on an on-premises network device or remote analysis service. Regardless of the deployment architecture, the cyber-attack analysis device groups, correlates and classifies received indicators and, when applicable, issues alerts to network administrators to identify threats resident in the enterprise network.

An illustrative example of the operations conducted by the correlation logic to generate a "strong" indicator from a group of "weak" indicators is described below. First, the correlation engine receives indicators, which may include strong indicators and/or weak indicators. Second, according to one embodiment of the disclosure, a plurality of the received indicators, wholly or at least primarily weak indicators, are extracted from the received information. Third, the correlation logic conducts (i) a first grouping operation on the plurality of indicators in accordance with a first index parameter (i.e., first factor) to produce a first group (e.g., two or more) of indicators and (ii) a second grouping operation on the first group of indicators in accordance with a second index parameter (i.e., second factor) to produce a second group (e.g., two or more) of indicators. Weak indicator correlation rules specify a grouping scheme based on specified indicator factors and index parameters. The first index parameter may be a time-based index parameter (e.g., indicators occurring or detected during a predetermined period of time) while the second index parameter may be based on certain context information that may accompany the indicators such as a source identifier that identifies the network device providing the received indicator (e.g., source Internet Protocol "IP" address, host name, user name, etc.). Fourth, the correlation logic determines, for each of the first and second groups, whether there exists a first prescribed level of correlation between the group of indicators and different patterns and/or sequences of indicators of known cyber-attacks (e.g., malware) or, where a positive determination means that one or both of the first and second groups is a strong indicator. Fifth, the correlation logic determines that a cyber-attack is in progress or has occurred based, at least in part, on the strong indicator or indicators represented by the first and second groups. Finally, reporting logic issues an alert to a security admin, e.g., over a communication or computer network, as to the classification indicating a cyber-attack.

Aspects of the invention may find application in a variety of cybersecurity contexts—for instance, in analyzing the network traffic between network endpoints during or after a potential cyber-attacks, and/or in analyzing network traffic between the network periphery and network endpoints, etc.—thereby enhancing the detection of malware communicating between network devices in a protected network (the network under analysis).

Hence, the cyber-attack analysis device is advantageous over conventional analyses in that it further refines detection of malware by using already collected information in a superior manner to improve the accuracy of malware detection and more accurate determination of an on-going cyber-attack.

II. Terminology

In the following description, certain terminology is used to describe various features of the invention. For example, each of the terms "logic" and "component" may be representative of hardware, firmware or software that is configured to perform one or more functions. As hardware, the term logic (or component) may include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

Additionally, or in the alternative, the logic (or component) may include software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or component) may be stored in persistent storage.

Herein, a "communication" generally refers to related data that is received, transmitted, or exchanged within a communication session. The data may include a plurality of packets, where a "packet" broadly refers to a series of bits or bytes having a prescribed format. Alternatively, the data may include a collection of data that may take the form of an individual or a number of packets carrying related payloads, e.g., a single webpage received over a network.

The term "object" generally relates to content (or a reference for accessing such content) having a logical structure or organization that enables it to be classified for purposes of malware analysis. The content may include an executable (e.g., an application, program, code segment, a script, dynamic link library "dll" or any file in a format that can be directly executed by a computer such as a file with an ".exe" extension, etc.), a non-executable (e.g., a storage file; any document such as a Portable Document Format "PDF" document; a word processing document such as Word® document; an electronic mail "email" message, web page, etc.), or simply a collection of related data (e.g., packets).

The term "computerized" generally represents that any corresponding operations are conducted by hardware in combination with software and/or firmware. The term "data store" generally refers to a data storage device such as the non-transitory storage medium described above, which may include a repository for non-persistent or persistent storage of collected data.

According to one embodiment of the disclosure, the term "malware" may be broadly construed as any code, communication or activity that initiates or furthers a cyber-attack. Malware may prompt or cause unauthorized, anomalous, unintended and/or unwanted behaviors or operations constituting a security compromise of information infrastructure. For instance, malware may correspond to a type of malicious computer code that, as an illustrative example, executes an exploit to take advantage of a vulnerability in a network, network device or software, to gain unauthorized access, harm or co-opt operations of the network, the network device of the software or to misappropriate, modify or delete data. Alternatively, as another illustrative example, malware may correspond to information (e.g., executable code, script(s), data, command(s), etc.) that is designed to cause a network device to experience anomalous (unexpected or undesirable) behaviors. The anomalous behaviors may include a communication-based anomaly or an execution-based anomaly, which, for example, could (1) alter the functionality of a network device executing application software in an atypical manner; (2) alter the functionality of the network device executing that application software without any malicious intent; and/or (3) provide unwanted functionality which may be generally acceptable in another context.

A "characteristic" includes data associated with an object under analysis that may be collected without execution of the object such as metadata associated with the object (e.g., size, name, path, etc.) or content of the object (e.g., portions of code) without execution of the selected object. A "behavior" is an activity that is performed in response to execution of the object.

The term "network device" may be construed as any electronic computing system with the capability of processing data and connecting to a network. The network may be a public network such as the Internet or a private network such as a wireless data telecommunication network, wide area network, a type of local area network (LAN), or a combination of networks. Examples of a network device may include, but are not limited or restricted to, a laptop, a mobile phone, a tablet, a computer, a standalone appliance, a server, a router or other intermediary communication device, a firewall, etc.

The term "transmission medium" may be construed as a physical or logical communication path between two or more network devices or between components within a network device. For instance, as a physical communication path, wired and/or wireless interconnects in the form of electrical wiring, optical fiber, cable, bus trace, or a wireless channel using radio frequency (RF) or infrared (IR), may be used. A logical communication path may simply represent a communication path between two or more network devices or between components within a network device.

Finally, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. General Architecture

Referring to FIG. 1, an exemplary block diagram of an embodiment of an architecture of a cyber-attack analysis device 100 is shown. Herein, the cyber-attack analysis device 100 comprises a plurality of components, including one or more hardware processors (referred to as "processor") 110, a memory 120, one or more data stores (hereinafter, "data store") 130, a rules database 140 and/or one or more interfaces $150_1$-$150_M$ (M≥1), which may include network interfaces and/or input/output (I/O) interfaces. According to this embodiment of the disclosure, these components may be communicatively coupled together by a transmission medium 160 such as any type of interconnect (e.g., bus, wires, printed connections, one or more APIs, etc.), and the components are at least partially encased in a housing 170 made entirely or partially of a rigid material (e.g., hardened plastic, metal, glass, composite, or any combination thereof). The housing 170 protects these components from environmental conditions.

The processor 110 is a multi-purpose, programmable component that accepts digital data as input, processes the input data according to stored instructions, and provides results as output. One example of a processor may include an Intel® x86 central processing unit (CPU) with an instruction set architecture. Alternatively, the processor 110 may include another type of CPU, a digital signal processor (DSP), an Application Specific Integrated Circuit (ASIC), a field-programmable gate array (FPGA), or the like.

According to one embodiment of the disclosure, the processor 110 is communicatively coupled to the memory 120 and the data store 130 via the transmission medium 160. The data store 130 is adapted to store at least indicators of compromise (hereinafter, "indicators"). These indicators include characteristics and/or behaviors collected from malware analyses conducted remotely from the cyber-attack analysis device 100 (e.g., indicators from different network devices such as endpoint device, security appliance, and/or cloud-based security services). Additionally, or in the alternative, the indicators may be based on malware analyses conducted internally within the cyber-attack analysis device 100.

Referring still to FIG. 1, the cyber-attack analysis device 100 may include interface logic $150_1$, which may be implemented as a capturing device (e.g., network tap that extracts objects from the network traffic, one or more ports, etc.) that provides the objects associated with the network traffic to a first portion 131 of the data store 130 (referred to as "raw data store" 131). The processor 110 may conduct malware analyses on the objects stored in the raw data store 131 upon execution of static analysis logic 122 and/or dynamic analysis logic 124 stored in the memory 120. When executed by the processor 110, the static analysis logic 122 is configured to analyze contents (i.e., characteristics) of an object under analysis. When executed by the processor 110, the dynamic analysis logic 124 provisions at least one virtual machine (VM), which executes the object and monitors behaviors of the object and/or any applications executing the object within the VM. The monitored behaviors of the object and/or applications running in the VM are indicators provided to a second portion 132 of the data store 130 (referred to as "indicator data store 132").

Besides the static analysis logic 122 and the dynamic analysis logic 124, the memory 120 includes software that controls functionality of the processor 110, such as correlation logic 180. The correlation logic 180 analyzes certain received indicators for patterns and/or sequences that are associated with known (e.g., previously detected) malware or cyber-attacks, as described below. The analyses conducted by the correlation logic 180 are governed, at least in part, by correlation rules loaded into the rules database 140.

The rules database 140 includes a first plurality of correlation rules for use in determining "strong" indicators from a subset of the indicators stored in the indicator data store 132 along with a second plurality of correlation rules for use in determining whether any "strong" indicators are uncovered from a combination of a plurality of "weak" indicators. The second plurality of correlation rules are configured to now analyze indicators that were not fully considered. It is contemplated that the correlation rules within the rules database 140 may be dynamic to select various combinations of indicators for analysis, where the selected combinations (groups) may be static (i.e. preselected indicators) or dynamic in nature. The dynamically selected groups may be based on a weighting scheme where certain combinations of "weak" indicators, which are generally known from machine learning or experiential knowledge from past analyses of indicators known to have higher levels of correlation to indicators associated with known malware, are selected as part of the group.

The network interfaces $150_1$-$150_M$ may include one or more network ports containing the mechanical, electrical and/or signaling circuitry needed to connect the cyber-attack analysis device 100 to a network to thereby facilitate communications to other remotely located electronic devices. To that end, the interfaces $150_1$-$150_M$ may be configured to transmit and/or receive messages using a variety of communication protocols including, inter alia, Transmission Control Protocol/Internet Protocol (TCP/IP), Hypertext Transfer Protocol (HTTP), or HTTP Secure (HTTPS). As an illustrated example, a first interface $150_1$ may be adapted to receive data traffic propagating over the monitored network (or a copy thereof) while a second interface $150_2$ may be adapted to receive indicators from one or more network (source) devices 190 remotely located from the cyber-attack analysis device 100. Additionally, a third network interface $150_3$ may be adapted to receive security content including software-based correlation rules 195 from a remote source. The correlation rules 195 are processed by the correlation logic 180 in determining whether any combination of (weak) indicators results in the finding of a strong indicator. The contents of the strong indicator are reported by a network administrator by reporting logic 185 via a fourth interface $150_4$ (described below).

IV. Operability of the Cyber-Attack Analysis Device

Figure 2:
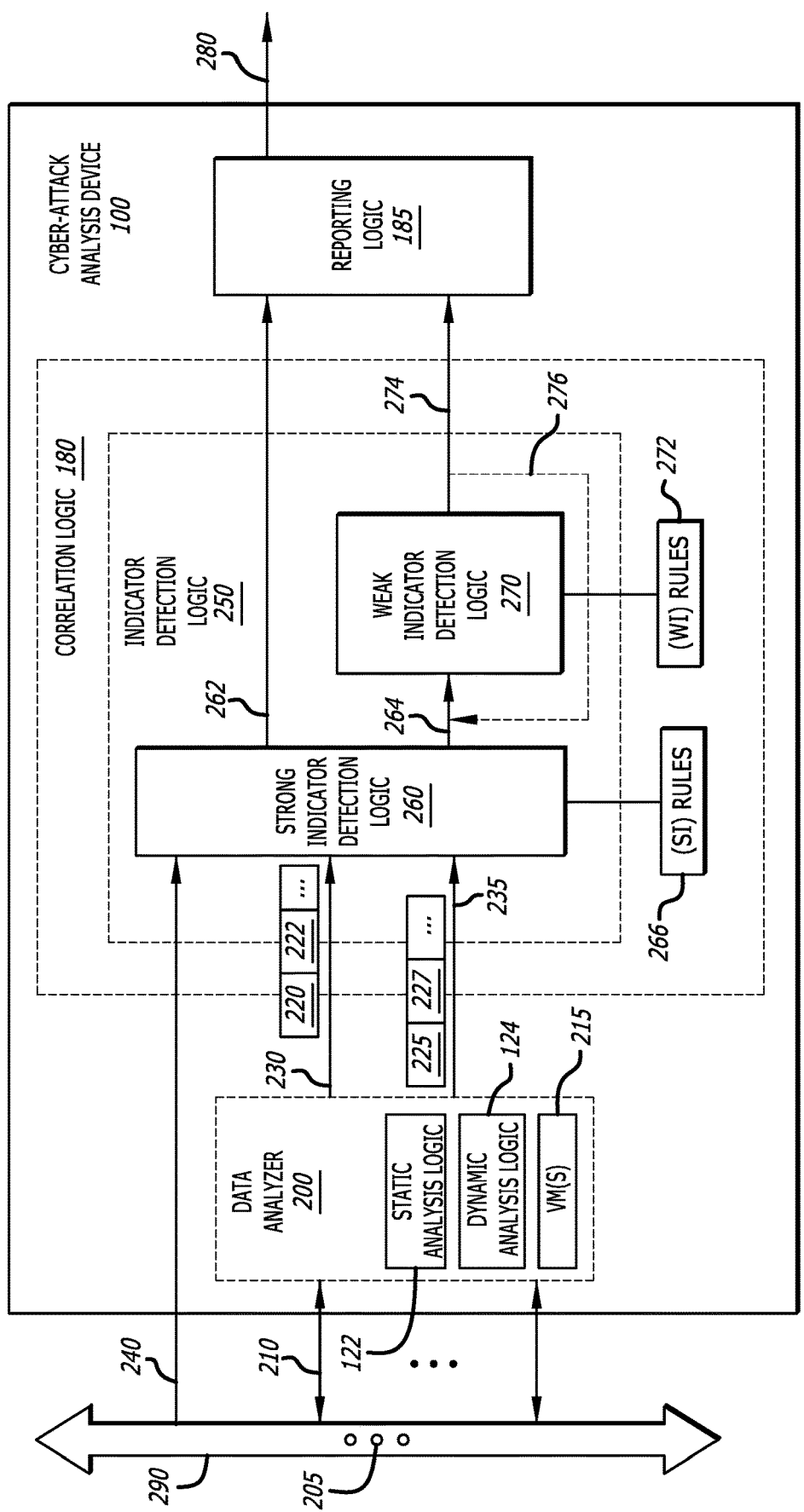
FIG. 2 is an exemplary block diagram of a logical representation of the cyber-attack analysis device of FIG. 1 including operability of correlation logic for use in generating a strong indicator from a group of weak indicators.

Referring now to FIG. 2, an exemplary block diagram of a logical representation of the cyber-attack analysis device 100 of FIG. 1 that illustrates the correlation logic 180 for use in generating a strong indicator from a plurality of weak indicators is shown. Herein, the cyber-attack analysis device 100 features an optional data analyzer 200, the correlation logic 180, and the reporting logic 185. The data analyzer 200 is adapted to receive data 210 as one or more objects from data traffic 205 being routed over an enterprise network 290. The functionality of the data analyzer 200 is based, at least in part, on the static analysis logic 122 and/or the dynamic analysis logic 124 as described above.

More specifically, the data analyzer 200 (e.g., static analysis logic 122 functionality) may be configured to analyze the contents of one or more objects (hereinafter, "object") 210 being transmitted as part of the network traffic 205. Hence, the data analyzer 200 (e.g., static analysis logic 122 functionality) may determine characteristics of the object 210, such as the object name, object type, object size, path, presence of particular code structures, or the like. The characteristics may be provided as part of the indicators 230 to the correlation logic 180 along with metadata associated with these characteristics. Examples of metadata may include, but are not limited or restricted to time-stamps each identifying the time of detection of the characteristics for example.

The dynamic analysis logic 124 is configured to process the object 210, where such processing may occur before, after or contemporaneously (i.e., at least partially occurring at the same time) with the analysis performed by the static analysis logic 122. The processing may be performed by at least one virtual machine (VM) 215, operating as part of the dynamic analysis logic 124, which executes the object 210 and monitors resultant behaviors 225. The monitored behaviors 225 may include (i) behaviors of the object 210 during processed within the VM 215, (ii) behaviors of software (e.g., operating system, applications, etc.) that is processing the object 210 within the VM 215, and/or (iii) behaviors of the VM 215 itself. Metadata 227 associated with the behaviors 225, such as a time-stamp identifying the time of occurrence of each behavior or a source of code whose execution caused the behavior for example, may be collectively provided as indicators 235 to the correlation logic 180. These indicators 230 and 235 are identified as being sourced by the cyber-attack analysis device 100.

Furthermore, in some embodiments, indicators (e.g., characteristics and/or behaviors) 240 resulting from malware analyses by one or more network devices (not shown) geographically separated from the cyber-attack analysis device 100 (e.g., network devices 190 of FIG. 1) are provided to the correlation logic 180. These indicators 240 circumvent the data analyzer 200.

Figure 3:
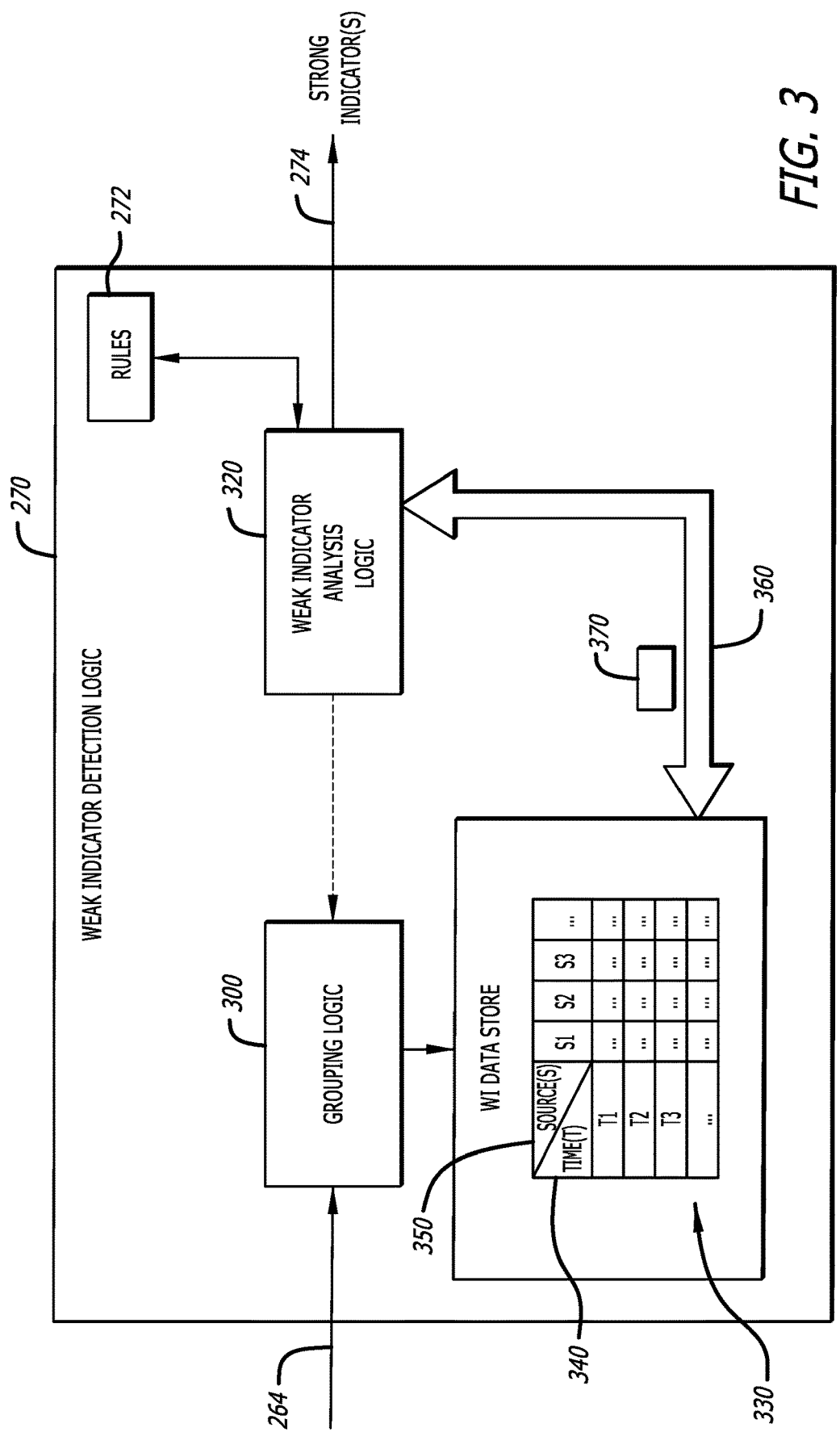
FIG. 3 is an exemplary embodiment illustrating weak indicator detection logic of FIG. 2.

The correlation logic 180 comprises indicator detection logic 250. According to one embodiment of the disclosure, the indicator detection logic 250 features a strong indicator detection logic 260 and a weak indicator detection logic 270. The strong indicator detection logic 260 and the weak indicator detection logic 270 may be deployed as separate logic or portions of the same logic that operates iteratively to detect any strong indicators 262. The detected strong indicators 262 are provided to the reporting logic 185, and thereafter, the remaining (weak) indicators 264 are grouped for further analysis as illustrated in FIG. 3 and described below.

Operating in accordance with a first plurality of correlation rules 266, which may be formulated through machine learning (e.g., prior results from analyses of other objects by the cyber-attack analysis device 100) and intelligence gathered from other sources (e.g., incident response analytics, third party analytics, etc.), the strong indicator detection logic 260 determines whether a first prescribed level of correlation exists between each of the indicators 235 and/or 240 and the indicators associated with known malware. This correlation activity may include conducting comparisons between (i) any or all of the individuals indicators 235 and/or 240 and (ii) indicators associated with known malware, and optionally, one or more comparisons between (a) a plurality of the indicators 235 and/or 240 assembled in accordance with a first grouping scheme and (b) a first plurality of patterns and/or sequences of indicators associated with known malware. Although not shown, the indicators associated with known malware and the first plurality of patterns and/or sequences of indicators associated with known malware may be statically or dynamically stored and accessible by the first plurality of correlation rules 266.

In response to the correlation exceeding a first threshold (e.g., a level of correlation greater than a particular threshold (e.g., percentage)), the individual indicator or indicators assembled in accordance with a first grouping scheme is provided as a strong indicator 262 to the reporting logic 185. Additionally, the individual indicators 235 and/or 240 that do not constitute "strong" indicators, referred to as the "set of indicators" 264, are provided to the weak indicator detection logic 270.

Operating in accordance with a second plurality of correlation rules 272, the weak indicator detection logic 270 determines whether a second prescribed level of correlation exists between certain groups of indicators assembled from the set of indicators 264 and a second plurality of patterns and/or sequences of indicators associated with known malware. The second plurality of correlation rules 272, also formulated through machine learning and intelligence gathered from other sources, is different than the first plurality of correlation rules 266. For instance, the second plurality of correlation rules 272 may be directed on one or more patterns or sequences that are observed less frequently (or associated with less harmful malware) than patterns and/or sequences set forth in the first plurality of correlation rules 266. Also, the second prescribed level of correlation may be identical to, less, or greater than the first prescribed level of correlation.

The correlation operations performed by the weak indicator detection logic 270 may include one or more comparisons between (a) one or more groups of indicators assembled from the set of indicators 264 in accordance with a second grouping scheme and (b) the second plurality of patterns and/or sequences of indicators associated with known malware, which partially or wholly differs from the first plurality of patterns and/or sequences of indicators associated with known malware. Although not shown, the patterns and/or sequences of indicators associated with known malware may be statically or dynamically stored and accessible by the second plurality of correlation rules 272.

Responsive to the comparison resulting in a measured correlation greater than a second prescribed threshold (e.g., the level of correlation being greater than a selected comparison percentage), the particular group or groups of indicators are provided as strong indicators 274 to the reporting logic 185. However, depending on the correlation rules 272, a particular group of indicators may be provided as feedback over line 276 to the weak indicator detection logic 270 for use in subsequent malware analyses. Of course, it is contemplated that the recursive feedback of indicators may be conducted for each weak indicator individually where the weak indicators may be grouped separately in subsequent malware analyses or a recursive feedback may be conducted for one or more strong indicators.

It is contemplated that the correlation logic 180 is rules driven. Hence, the correlation logic may be configured to issue an alert or not, reinject one or more weak indicator back into an internal data store of the weak indicator detection logic 270 for subsequent correlation analyses or reinject one or more strong indicators back into an internal data store of the strong indicator detection logic 260 for subsequent correlation analyses is rules dependent. According to one embodiment of the disclosure, once an indicator is identified as a strong indicator (e.g., results in an alert), the indicator will continue to remain as a strong indicator; however, one or more weak indicators, especially a pattern of a plurality of weak indicators, may be collectively determined to constitute a strong indicator.

The reporting logic 185 is configured to receive the "strong" indicators 262 and 274 from both the strong indicator detection logic 260 and the weak indicator detection logic 270, respectively. The reporting logic 185 is further configured to generate alerts 280 for display and evaluation by network administrators. In accordance with one embodiment, an "alert" includes a message that includes display or other user presentation of information that specifies a cyber-attack is in progress or has occurred and may also identify the strong indicators that support the determination of the cyber-attack.

Referring to FIG. 3, an exemplary embodiment illustrating the weak indicator detection logic 270 of FIG. 2 is shown. The weak indicator detection logic 270 features grouping logic 300, a first data store 310 (separate or part of data store 130), and weak indicator analysis logic 320. The grouping logic 300 is configured to organize the set of indicators 264 into a prescribed schema for storage in the first data store 310. The first schema allows for selective fetching of indicators by the weak indicator analysis logic 270 in accordance with the second plurality of correlation rules 272. For instance, as an illustrative example, indicators 330 partially forming the set of indicators 264 may be stored within the first data store 310 in accordance with the first schema. The indicators 330 may be indexed according to a first index parameter 340 (e.g., time as represented by a timestamp issued when the indicator is detected) and a second index parameter 350 (e.g., the source that provided the indicators 330, which may be represented by a source identifier such as a source IP address, host name, user name, media access control "MAC" address, or the like). Of course, besides the first schema, other schemas may be utilized by the grouping logic 300.

Based on the second plurality of correlation rules 272, the weak indicator analysis logic 320 accesses one or more groups of indicators within the first data store 310 via medium 360. Within the first data store 310, the indicators 330 are organized in accordance with selected index parameters (e.g., a time window, source identifier, destination identifier, geographic location identifiers, etc.). Based on the correlation rules 272, a group of indicators 370 from a particular source or sources and/or within a selected time window (e.g., a sliding time window normally less than two minutes) may be fetched by the weak indicator analysis logic 320. The group of indicators 370 is analyzed by the weak indicator analysis logic 320 to determine whether a measured correlation greater than the second prescribed threshold exists between (i) the indicators 330 and (ii) the second plurality of patterns and/or sequences of indicators associated with known malware. If so, the group of indicators 370 constitutes a "strong" indicator and information associated with the group of indicators 370 (and/or the indicators 370 as well) may be provided to the reporting logic 185.

Figure 4:
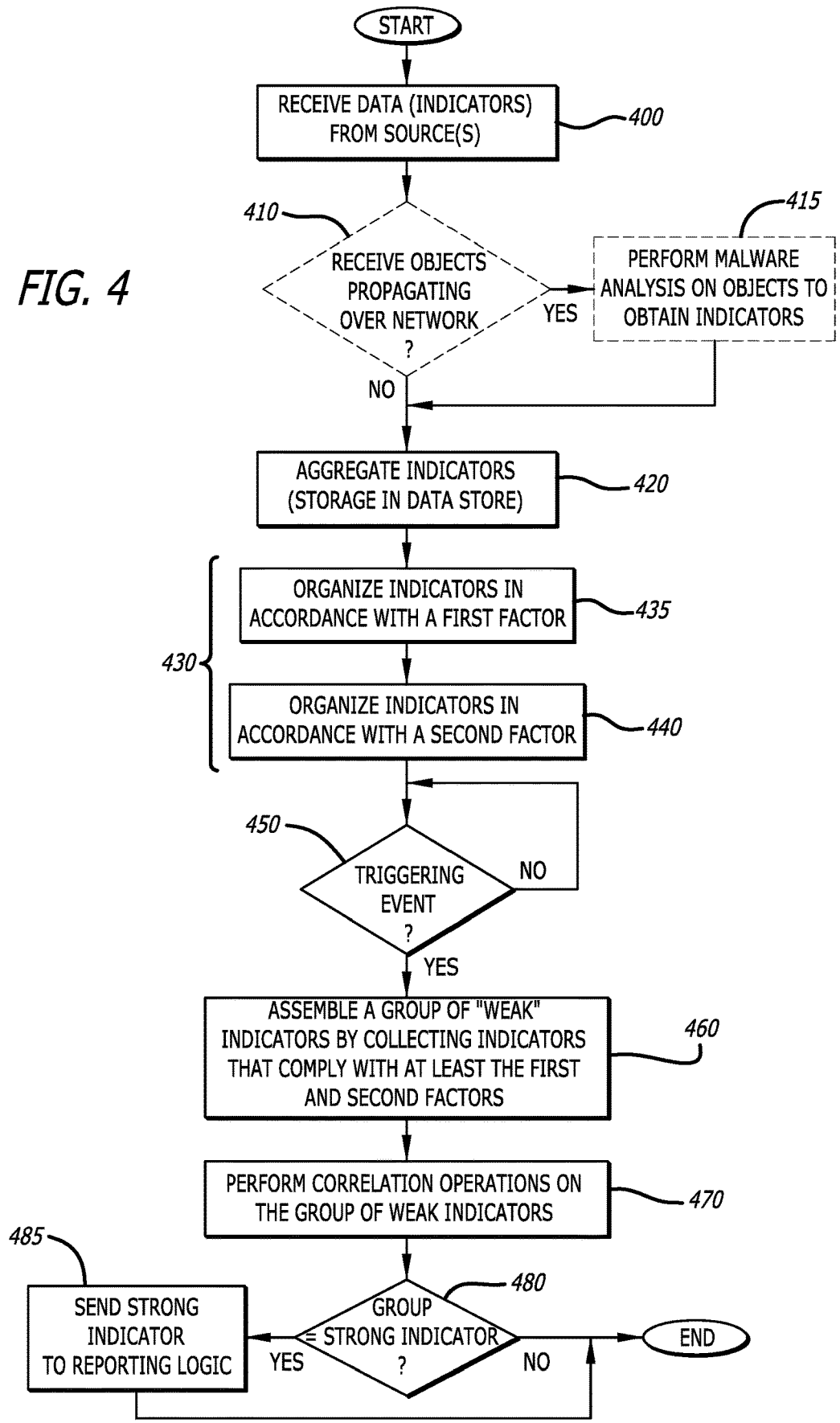
FIG. 4 is an exemplary embodiment of a flowchart illustrating operations of the weak indicator detection logic of FIG. 3.

Referring to FIG. 4, an exemplary embodiment of a flowchart illustrating operations of the weak indicator detection logic of FIG. 3 is shown. Initially, data is received from one or more sources (block 400). The data may include indicators that represent characteristics uncovered by or behaviors monitored during malware analyses of objects conducted by one or more sources different than the cyber-attack analysis device. As an optional additional source, the cyber-attack analysis device may further receive and analyze objects from network traffic propagating over an enterprise network, and if so, any indicators produced from the analysis of the network traffic by the cyber-attack analysis device are aggregated with the incoming indicators (blocks 410, 415 and 420). For these aggregated indicators, each indicator has insufficient correlation with indicators associated with known malware to cause the weak indicator analysis device to conclude that the indicator represents a "strong" indicator by itself.

Thereafter, the aggregated indicators are organized in accordance with a plurality of index parameters forming the first schema (block 430). For instance, as an illustrated example, the aggregated indicators may be organized in accordance with a first index parameter (e.g., by time of occurrence of the indicator) and a second index parameter (e.g., by source identifier) as illustrated in blocks 435 and 440. The organization can be conducted in accordance with multiple index parameters utilized by the second plurality of correlation rules that at least partially control operability of the weak indicator detection logic 270 within the cyber-attack analysis device 100 of FIGS. 1-3. Other index parameters may include, but are not limited or restricted to destination identifier (e.g., destination IP address or other referencing information), geographic location identifier, or the like In response to a triggering event (e.g., a predetermined amount of data is loaded in the first data store 310 of FIG. 3, the weak indicator detection logic accesses and operates in accordance with the second plurality of correlation rules by collecting those "weak" indicators that reside with the time and source type constraints set forth in the second plurality of correlation rules (blocks 450 and 460). Therefore, weak indicator detection logic performs a correlation operation on different combinations (groups) of collected weak indicators to patterns and/or sequences associated with known malware (block 470). If any of these groups correlates (i.e., matches to a sufficient degree) the patterns and/or sequences associated with known malware, the group is reported to the reporting logic (blocks 480 and 485). Otherwise, the weak indicators may not offer any additional information for assisting the cyber-attack analysis device in determining whether a cyber-attack is being conducted and which source (and identifiers) is associated with the cyber-attack.

Figure 5A:
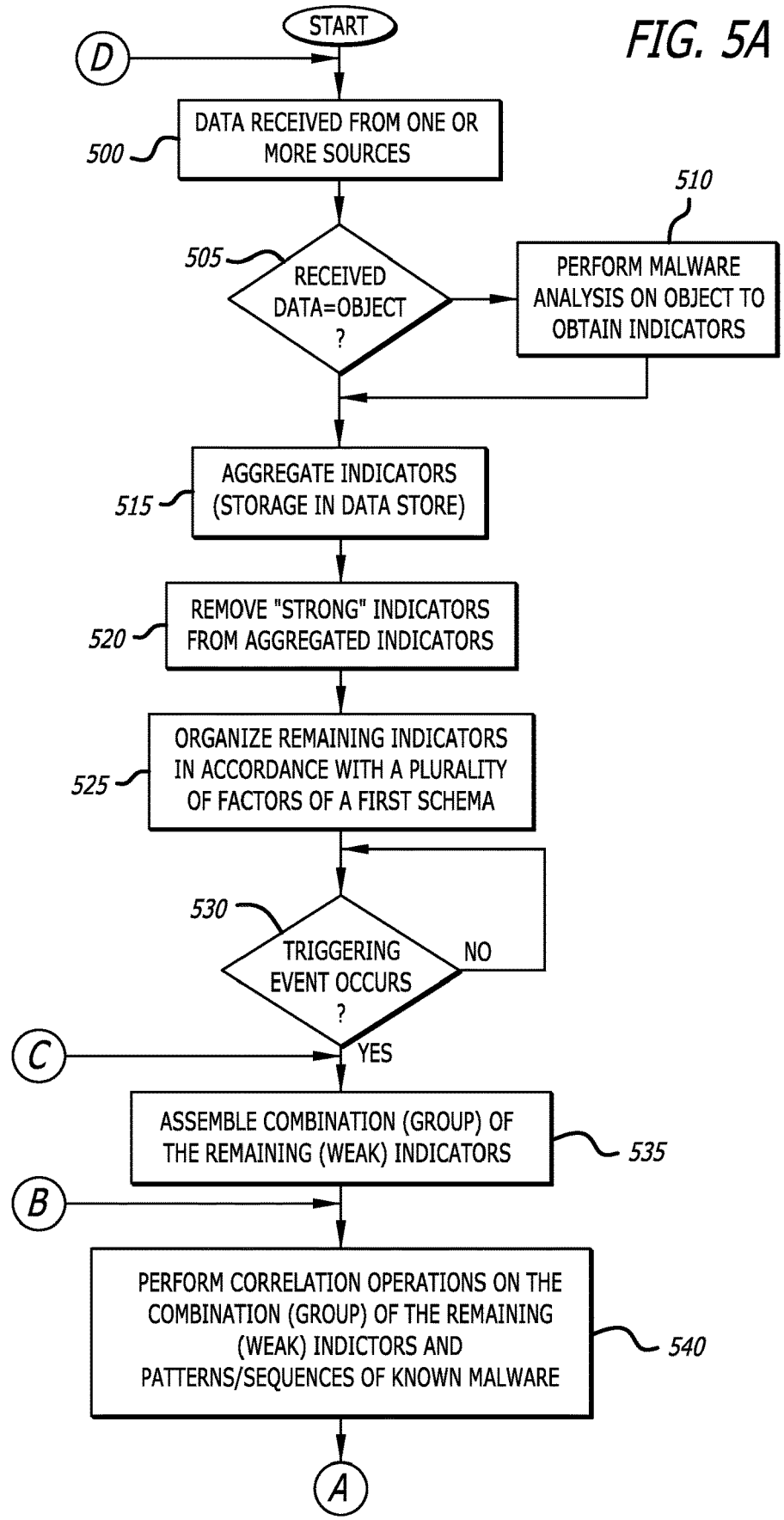
FIGS. 5A and 5B provide a more detailed embodiment of a flowchart illustrating the operations of the weak indicator detection logic of FIG. 3.
Figure 5B:
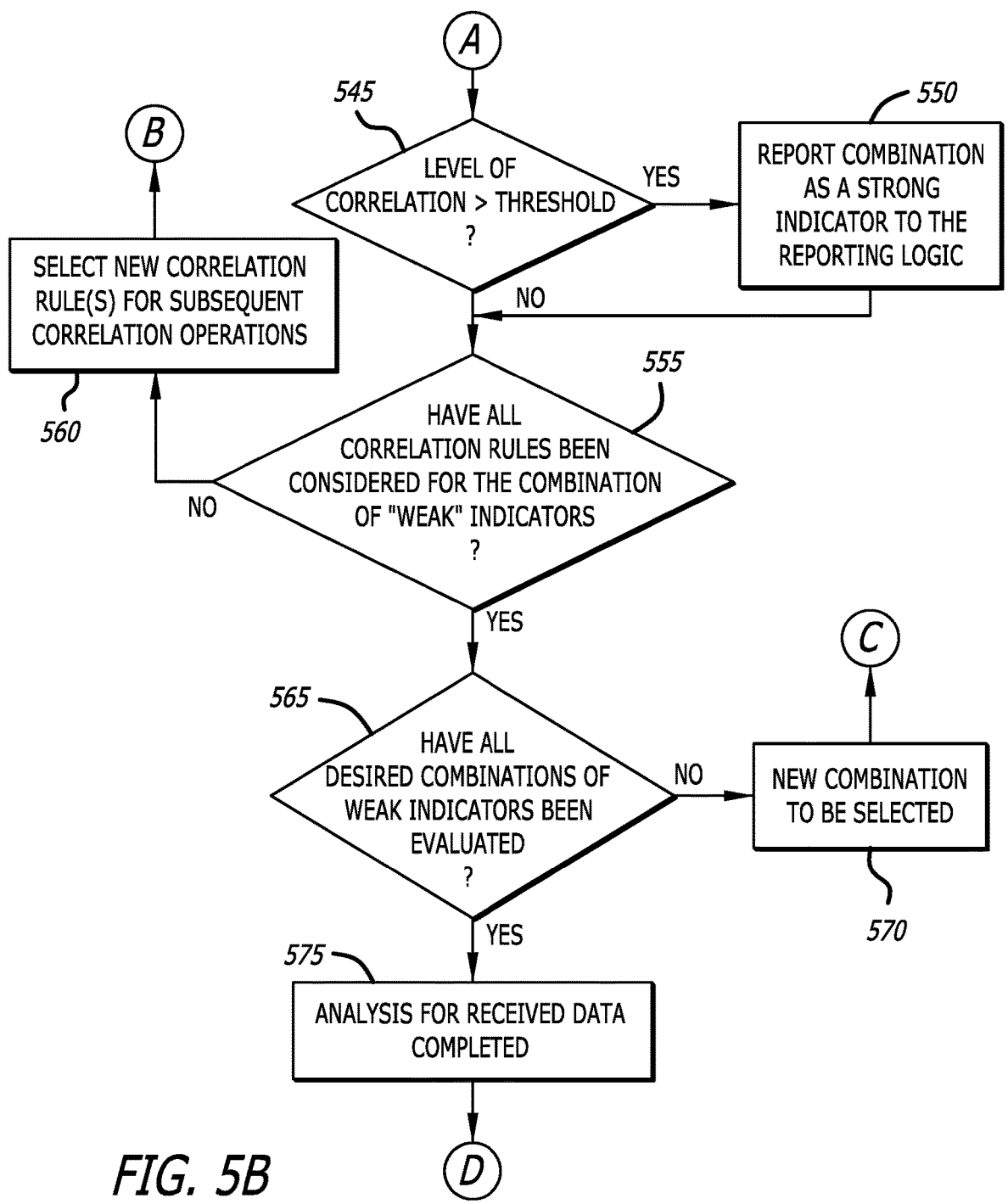

Referring now to FIGS. 5A and 5B, a more detailed embodiment of a flowchart illustrating the operations of the weak indicator detection logic of FIG. 3 is shown. Herein, data is received from one or more sources (block 500). A first determination is made whether the received data represents an object obtain from the network traffic, and if so, the object undergoes one or more malware analyses, which produce a plurality of indicators to be utilized for analysis (blocks 505 and 510). Otherwise, the received data represents characteristics uncovered or behaviors monitored during malware analyses of objects conducted by one or more sources different than the cyber-attack analysis device, which constitute a plurality of indicators that are aggregated (block 515).

For these indicators, the "strong" indicators may be removed (block 520). More specifically, an analysis is conducted for each of these indicators to determine whether a correlation between that indicator and one or more indicators associated with known malware exceeds a first threshold. If so, the indicator is a "strong" indicator. The remaining indicators are considered to be the "weak" indicators.

Thereafter, the "weak" indicators are organized in accordance with a plurality of index parameters forming the first schema (block 525). As an illustrated example, the "weak" indicators may be organized in accordance with a first index parameter (e.g., by time of occurrence of the indicator) and a second index parameter, such as the identifier of the source of the indicator, referred to as the "source identifier." In some embodiments, the organization can be conducted in accordance with a single parameter or multiple parameters.

In response to a selected triggering event (e.g., the "weak" indicators are loaded in a data store, expiration of a prescribed time where periodic analyses are conducted, receipt of the data, etc.), correlation operations are performed on different combinations (groups) of "weak" indicators and patterns and/or sequences associated with known malware (blocks 530, 535 and 540). The correlation operations may be in accordance with one or more of the second plurality of correlation rules. If any of these combinations correlates to any patterns and/or sequences associated with known malware, the combination of weak indicators corresponds to a strong indicator, and thus, information associated with the strong indicator (and perhaps the combination of weak indicators themselves) is reported to the reporting logic (blocks 545 and 550).

Otherwise (and concurrently or after the reporting of the strong indicator in blocks 545 and 550), a determination is made as to whether all of the second plurality of correlation rules have been considered in an analysis of the combination of weak indicators (block 555). If not, correlation operations in accordance with different correlation rule(s) may be performed on the combination of weak indicators (blocks 560 and 540-545). If so, a determination is made as to whether all combinations of the weak indicators have been evaluated (block 565). If all combinations of the weak indicators have not been evaluated, a new combination of weak indicators is selected and undergo the correlation operations with the patterns and/or sequences associated with known malware (blocks 570 and 535-550). Otherwise, the analysis of the received data is completed for the received data, but continues in an iterative manner (block 575).

Figure 6B:
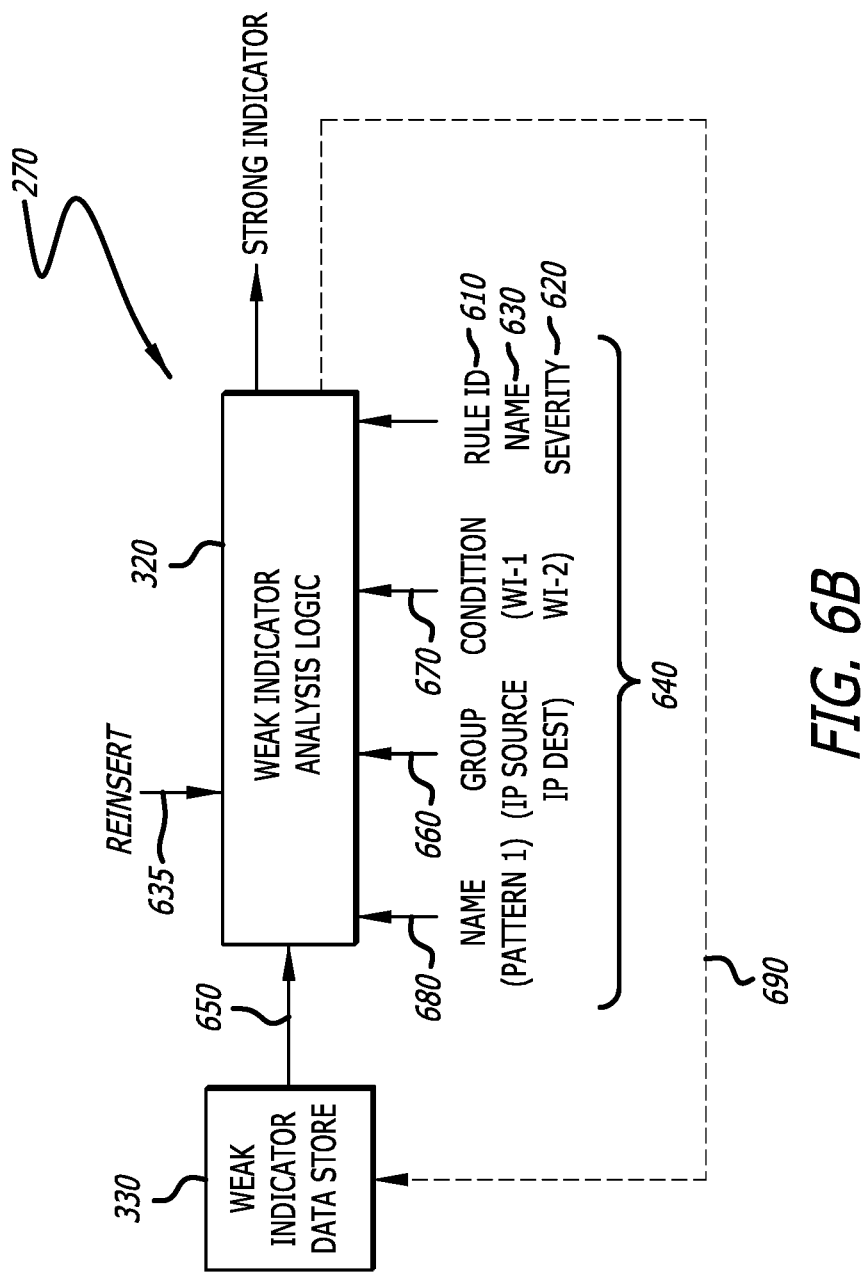

Referring to FIGS. 6A and 6B, a first exemplary block diagram of the operability of the weak indicator detection logic 270 of FIG. 3 is shown. In general, the weak indicator detection logic 270 includes a weak indicator analysis logic 320 that is adapted to receive one or more rules that control its operability in grouping and subsequent analysis of weak indicators. The analysis is conducted to determine whether this particular grouping of weak indicators constitutes a "strong" indicator, which signals a potential cyber-attack. Exemplary pseudo-code 600 of a first rule is shown in FIG. 6A and the block diagram of the logical operations is show in FIG. 6B:

Herein, the "Rule Id 1" 610 is directed to an identifier assigned to a pattern (e.g., "pattern 1") that includes a number of events (weak indicators). Any matching results are assigned a particular level of severity 620 (e.g., the highest severity being "10" out of 10). The severity 620 may identify, upon successful detection of the particular pattern (weak indicator 1 followed by weak indicator 2), a cyber-attack has been attempted (or is in process). Additionally, or in the alternative, the cyber-attack analysis device may utilize the severity 620 to determine an ordering of processing (e.g., rules associated with the highest severity are processed first with rules associated with lesser severity are processed as time permits).

The "name" field 630 is utilized to subsequently reference a particular collection (pattern) of indicators that are analyzed in accordance with a specified rule 640. The rule 640 identifies sources of the indicators (source field) 650, grouping scheme (group field) 660, analysis particulars (condition field) 670 and a pattern name 680 assigned to the newly analyzed patterns of weak indicators. The condition field 670 identifies what combination of index parameters are relied upon for grouping of the incoming indicators from sources. For this illustrative embodiment, the incoming indicators are group by IP source address and IP destination address, as identified in the group field 660. Of course, it is contemplated that other index parameters may be used. The condition field 670 specifically describes the particular pattern under review after grouping of the weak indicators. For this example, the cyber-attack analysis device is looking for a pattern in which a particular group (source and destination IP addresses) undercovers a targeted sequence 670 of events (e.g., first weak indicator "WI-1), second weak indicator "WI-2"). Upon detection of the matching sequence, a strong indicator has been determined from a sequence of weak indicators.

It is contemplated that the components forming the rules are modifiable and can be organized in a plurality of nesting arrangements. For example, as shown in FIG. 6B, the sequence of weak indicators associated with "pattern 1" 680 may be provided as input feedback 690 to the weak indicator analysis logic 320 (or data store 330) for subsequent correlation analysis as a separate weak indicator for a different correlation rule. Stated differently, certain rules may be coded to require that, instead of issuing an alert or a message as to detection of the sequence of weak indicators (i.e., "pattern 1" 680) that fail to arise to "strong" indicator status, the sequence of indicators is reinserted as input back into the analysis stage for future correlation. This may be accomplished by setting the Reinject keyword 635 to "Yes" instead of "No" (no feedback) as shown in FIG. 6A.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A computerized method for detecting a cyber-attack, the method comprising:
   performing one or more analyses of one or more objects associated with network traffic to determine a plurality of indicators;
   collecting a first plurality of weak indicators of the plurality of indicators, a first weak indicator of the first plurality of weak indicators corresponds to data that, by itself, is not definitive as to whether the data is associated with a cyber-attack being conducted on a source of the first weak indicator;
   grouping a second plurality of weak indicators from the first plurality of weak indicators, the second plurality of weak indicators being lesser in number than the first plurality of weak indicators;

performing a correlation operation between the second plurality of weak indicators and one or more patterns or sequences of indicators associated with known malware; and generating and issuing a report based on the correlation operation.

2. The computerized method of claim 1, wherein the first weak indicator represents an indicator having a probability less than a first prescribed probability level of the cyber-attack being conducted on the source of the first weak indicator.

3. The computerized method of claim 2, wherein the collecting of the first plurality of weak indicators comprises separating strong indicators from a plurality of indicators where remaining indicators of the plurality of indicators correspond to the first plurality of weak indicators, a first strong indicator corresponds to data that, based on its presence alone, represents a likelihood above a second prescribed probability level of the cyber-attack conducted on at least the source of the first strong indicator.

4. The computerized method of claim 1, wherein each of first plurality of weak indicators corresponds to data that represents, based on its presence alone, a likelihood below a first prescribed probability level of the cyber-attack.

5. The computerized method of claim 1, wherein the grouping of the second plurality of weak indicators comprises combining two or more weak indicators in accordance with one or more grouping factors.

6. The computerized method of claim 5, wherein the grouping factors are static in nature.

7. The computerized method of claim 5, wherein the grouping factors each comprise an index parameter.

8. The computerized method of claim 1, wherein the one or more analyses include a dynamic analysis performed by one or more virtual machines.

9. A device for detecting a cyber-attack comprising:

data analyzer logic including an analysis logic, the data analyzer logic configured to conduct an analysis of one or more objects and to output a first plurality of indicators based on the analysis;

first indicator detection logic communicatively coupled to the data analyzer and operating in accordance with a first plurality of correlation rules, the first indicator detection logic to determine whether a prescribed level of correlation exists between each of the first plurality of indicators and an indicator associated with known malware to detect whether any of the first plurality of indicators constitutes a strong indicator that represents that a cyber-attack has potentially occurred on a source of the first plurality of indicators;

second indicator detection logic communicatively coupled to the data analyzer and operating in accordance with a second plurality of correlation rules, the second indicator detection logic to perform a correlation operation between (i) two or more indicators of a second plurality of indicators being a subset of the first plurality of indicators and each of the two or more indicators, individually, is not definitive as to whether a cyber-attack is being conducted on the source, and (ii) one or more patterns or sequences of indicators associated with known malware, the correlation operation to determine whether the two or more indicators correspond to a strong indicator that represents the cyber-attack has potentially occurred on the source of the first plurality of indicators; and reporting logic communicatively coupled to the strong indicator detection logic and the weak indicator logic, the reporting logic to generate an alert at least in response to detection of the strong indicator by the second indicator detection logic.

10. The device of claim 9, wherein the reporting logic further generates an alert in response to detection of the strong indicator by the first indicator detection logic.

11. The device of claim 9, wherein the two or more indicators are assembled by grouping the two or more indicators in accordance with a first grouping scheme conducted in accordance with the second plurality of correlation rules.

12. The device of claim 9, wherein the second indicator detection logic comprises:

a data store to store the two or more indicators;

grouping logic communicatively coupled to the data store, the grouping logic being configured to organize the second plurality of indicators; and weak indicator analysis logic communicatively coupled to the data store, the weak indicator analysis logic to selectively collect the two or more indicators and perform the correlation operation between (i) the two or more indicators and (ii) the one or more patterns or sequences of indicators associated with known malware in accordance with the second plurality of correlation rules.

13. The device of claim 12, wherein the grouping logic is configured to organize the second plurality of indicators into a prescribed schema for storage in the data store.

14. The device of claim 13, wherein the prescribed schema are indexed based on a first index parameter and a second index parameter.

15. The device of claim 14, wherein the first index parameter includes an indexing of the second plurality of indicators based on a time of detection.

16. The device of claim 14, wherein the second index parameter includes an indexing of the second plurality of indicators by source identifier.

17. The device of claim 9, wherein the one or more analyses include a dynamic analysis performed by one or more virtual machines.

18. A device for detecting a cyber-attack, comprising:

a processor; and a memory coupled to the processor, the memory comprises:

a first module that, upon execution by the processor, performs one or more analyses of one or more objects associated with network traffic to determine a plurality of indicators;

a second module that, upon execution by the processor, collects a first plurality of weak indicators of the plurality of indicators, wherein each of the first plurality of weak indicators corresponds to data that, individually, is not definitive as to whether the data is associated with a cyber-attack, a third module that, upon execution by the processor, groups a second plurality of weak indicators from the first plurality of weak indicators, the second plurality of weak indicators being lesser in number than the first plurality of weak indicators, the second set of weak indicators bring grouped based on a grouping factor that the second plurality of weak indicators share, and a fourth module that, upon execution by the processor, performs a correlation operation between the second plurality of weak indicators and one or more patterns or sequences of indicators associated with known malware.

19. The device of claim 18, wherein the first weak indicator represents an indicator having a probability less than a prescribed probability level of the cyber-attack being conducted on the source of the first weak indicator.

20. The device of claim 18, wherein the one or more analyses include a dynamic analysis performed by one or more virtual machines.

* * * * *